(12) United States Patent
Husband et al.

(10) Patent No.: US 10,724,535 B2
(45) Date of Patent: Jul. 28, 2020

(54) FAN ASSEMBLY OF A GAS TURBINE ENGINE WITH A TIP SHROUD

(71) Applicant: United Technologies Corporation, Farmington, CT (US)

(72) Inventors: Jason Husband, South Glastonbury, CT (US); James Glaspey, Farmington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 33 days.

(21) Appl. No.: 15/812,331

(22) Filed: Nov. 14, 2017

(65) Prior Publication Data

US 2019/0145423 A1    May 16, 2019

(51) Int. Cl.
  F01D 5/22      (2006.01)
  F04D 29/32     (2006.01)
  F02K 3/06      (2006.01)
  F04D 19/00     (2006.01)
  F04D 29/66     (2006.01)

(52) U.S. Cl.
  CPC ........... *F04D 29/326* (2013.01); *F01D 5/225* (2013.01); *F02K 3/06* (2013.01); *F04D 19/002* (2013.01); *F04D 29/666* (2013.01); *F05D 2220/323* (2013.01); *F05D 2220/327* (2013.01); *F05D 2220/36* (2013.01); *F05D 2240/12* (2013.01)

(58) Field of Classification Search
  CPC .... F01D 5/225; F01D 511/12; F01D 511/122; F01D 511/14; F01D 511/20; F01D 511/24; F01D 511/02; F01D 511/025; F01D 521/045; F01D 525/06; F04D 29/326; F04D 29/666; F04D 29/668; F04D 29/164; F05D 2220/36; F05D 2260/96; F05B 2220/33; F05B 2260/96
  USPC ........................ 415/173.1–173.5, 173.6, 189
  See application file for complete search history.

(56) References Cited

U.S. PATENT DOCUMENTS

| 3,680,977 | A | * | 8/1972 | Rabouyt | ............... | B64C 11/001 |
| | | | | | | 415/173.6 |
| 3,966,356 | A | * | 6/1976 | Irwin | ...................... | F01D 11/08 |
| | | | | | | 415/173.3 |
| 4,334,822 | A | * | 6/1982 | Rossmann | .............. | F01D 11/24 |
| | | | | | | 415/113 |
| 5,344,284 | A | * | 9/1994 | Delvaux | ................. | F01D 11/22 |
| | | | | | | 415/173.2 |
| 5,785,496 | A | | 7/1998 | Tomita | | |

(Continued)

FOREIGN PATENT DOCUMENTS

| WO | 2014096840 A1 | 6/2014 |
| WO | 2014099713 A1 | 6/2014 |
| WO | 2014143305 A1 | 9/2014 |

OTHER PUBLICATIONS

Extended European Search Report for European Application No. 18206337.0; Date of Completion: Apr. 1, 2019; dated Apr. 12, 2019; 6 Pages.

*Primary Examiner* — Kenneth J Hansen
*Assistant Examiner* — Andrew J Marien
(74) *Attorney, Agent, or Firm* — Cantor Colburn LLP (57) ABSTRACT

A fan of a gas turbine engine is provided. The fan having: a plurality of fan blades secured to a rotor, each of the plurality of fan blades having an airfoil secured to the rotor at one end and a tip portion that is secured to a shroud that circumscribes the plurality of fan blades.

20 Claims, 6 Drawing Sheets

(56) References Cited

U.S. PATENT DOCUMENTS

| | | | | |
|---|---|---|---|---|
| 6,116,852 | A * | 9/2000 | Pierre | F01D 11/24 |
| | | | | 415/115 |
| 6,368,054 | B1 * | 4/2002 | Lucas | F01D 11/08 |
| | | | | 415/135 |
| 7,393,182 | B2 | 7/2008 | Matheny | |
| 7,654,791 | B2 * | 2/2010 | Werner | F01D 11/22 |
| | | | | 415/1 |
| 7,766,611 | B2 * | 8/2010 | Buchal | F01D 19/02 |
| | | | | 415/173.2 |
| 2007/0292270 | A1 * | 12/2007 | Suciu | F01D 5/225 |
| | | | | 416/189 |
| 2009/0097980 | A1 * | 4/2009 | Hayasaka | F01D 5/225 |
| | | | | 416/189 |
| 2013/0149163 | A1 * | 6/2013 | Parkos, Jr. | F01D 5/20 |
| | | | | 416/224 |
| 2014/0169972 | A1 | 6/2014 | Suciu et al. | |
| 2015/0337670 | A1 | 11/2015 | Merriman | |

* cited by examiner

FAN ASSEMBLY OF A GAS TURBINE ENGINE WITH A TIP SHROUD

BACKGROUND

Exemplary embodiments pertain to the art of fan assemblies of gas turbine engines. More particularly, a fan assembly with a tip shroud.

A gas turbine engine typically includes a fan section, a compressor section, a combustor section and a turbine section. Gas turbine engines with wide thin blades are suitable for providing thrust however, they are susceptible to flutter.

Accordingly, it is desirable to provide a fan assembly that addresses or mitigates flutter of fan blades.

BRIEF DESCRIPTION

In one embodiment, a fan of a gas turbine engine is provided. The fan having: a plurality of fan blades secured to a rotor, each of the plurality of fan blades having an airfoil secured to the rotor at one end and a tip portion that is secured to a shroud that circumscribes the plurality of fan blades.

In addition to one or more of the features described above, or as an alternative to any of the foregoing embodiments, the shroud may have a plurality of protrusions located on a radial outer surface of the shroud.

In addition to one or more of the features described above, or as an alternative to any of the foregoing embodiments, the shroud may have an elongated opening that extends between a leading edge and a trailing edge of the shroud, wherein the elongated opening is configured to receive a portion of a pair of integral pins that extend from the tip portion.

In addition to one or more of the features described above, or as an alternative to any of the foregoing embodiments, the elongated opening includes a pair of bleed holes that are located in the elongated opening proximate to the pins when they are received in the elongated opening.

In addition to one or more of the features described above, or as an alternative to any of the foregoing embodiments, the pin is movably received in a bushing that is embedded into the elongated opening.

In addition to one or more of the features described above, or as an alternative to any of the foregoing embodiments, the shroud may have a sheath secured to a leading edge of the shroud.

In addition to one or more of the features described above, or as an alternative to any of the foregoing embodiments, the shroud may have an elongated opening that extends between a leading edge and a trailing edge of the shroud, wherein the elongated opening is configured to receive a portion of a pair of integral pins that extend from the tip portion.

In addition to one or more of the features described above, or as an alternative to any of the foregoing embodiments, the elongated opening includes a pair of bleed holes that are located in the elongated opening proximate to the pins when they are received in the elongated opening.

In addition to one or more of the features described above, or as an alternative to any of the foregoing embodiments, the pin is movably received in a bushing that is embedded into the elongated opening.

In addition to one or more of the features described above, or as an alternative to any of the foregoing embodiments, the shroud may have a sheath secured to a leading edge of the shroud.

In another embodiment, a fan assembly of a gas turbine engine id provided. The fan assembly having: a plurality of fan blades secured to a rotor, each of the plurality of fan blades having an airfoil secured to the rotor at one end and a tip portion that is secured to a shroud that circumscribes the plurality of fan blades, wherein the shroud is rotatably received within a fan containment case of the fan assembly.

In addition to one or more of the features described above, or as an alternative to any of the foregoing embodiments, the shroud may have a plurality of protrusions located on a radial outer surface of the shroud and wherein the plurality of protrusions are slidably received in a plurality of grooves located on a radial inner surface of rub strip secured to the fan containment case.

In addition to one or more of the features described above, or as an alternative to any of the foregoing embodiments, the shroud may have an elongated opening that extends between a leading edge and a trailing edge of the shroud, wherein the elongated opening is configured to receive a portion of a pair of integral pins that extend from the tip portion.

In addition to one or more of the features described above, or as an alternative to any of the foregoing embodiments, the elongated opening includes a pair of bleed holes that are located in the elongated opening proximate to the pins when they are received in the elongated opening.

In addition to one or more of the features described above, or as an alternative to any of the foregoing embodiments, the rub strip may have a plenum fluidly coupled to a source of air and the plenum is in fluid communication with the bleed holes.

In addition to one or more of the features described above, or as an alternative to any of the foregoing embodiments, the pin is movably received in a bushing that is embedded into the elongated opening.

In addition to one or more of the features described above, or as an alternative to any of the foregoing embodiments, the shroud may have a sheath secured to a leading edge of the shroud.

In yet another embodiment, a gas turbine engine is provided. The gas turbine engine having: a fan, including; a plurality of fan blades secured to a rotor, each of the plurality of fan blades having an airfoil secured to the rotor at one end and a tip portion that is secured to a shroud that circumscribes the plurality of fan blades, wherein the shroud is rotatably received within a fan containment case of the fan assembly; a compressor; a combustor; and a turbine.

In addition to one or more of the features described above, or as an alternative to any of the foregoing embodiments, the shroud may have a plurality of protrusions located on a radial outer surface of the shroud and wherein the plurality of protrusions are slidably received in a plurality of grooves located on a radial inner surface of rub strip secured to the fan containment case.

In addition to one or more of the features described above, or as an alternative to any of the foregoing embodiments, the shroud may have an elongated opening that extends between a leading edge and a trailing edge of the shroud, wherein the elongated opening is configured to receive a portion of a pair of integral pins that extend from the tip portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
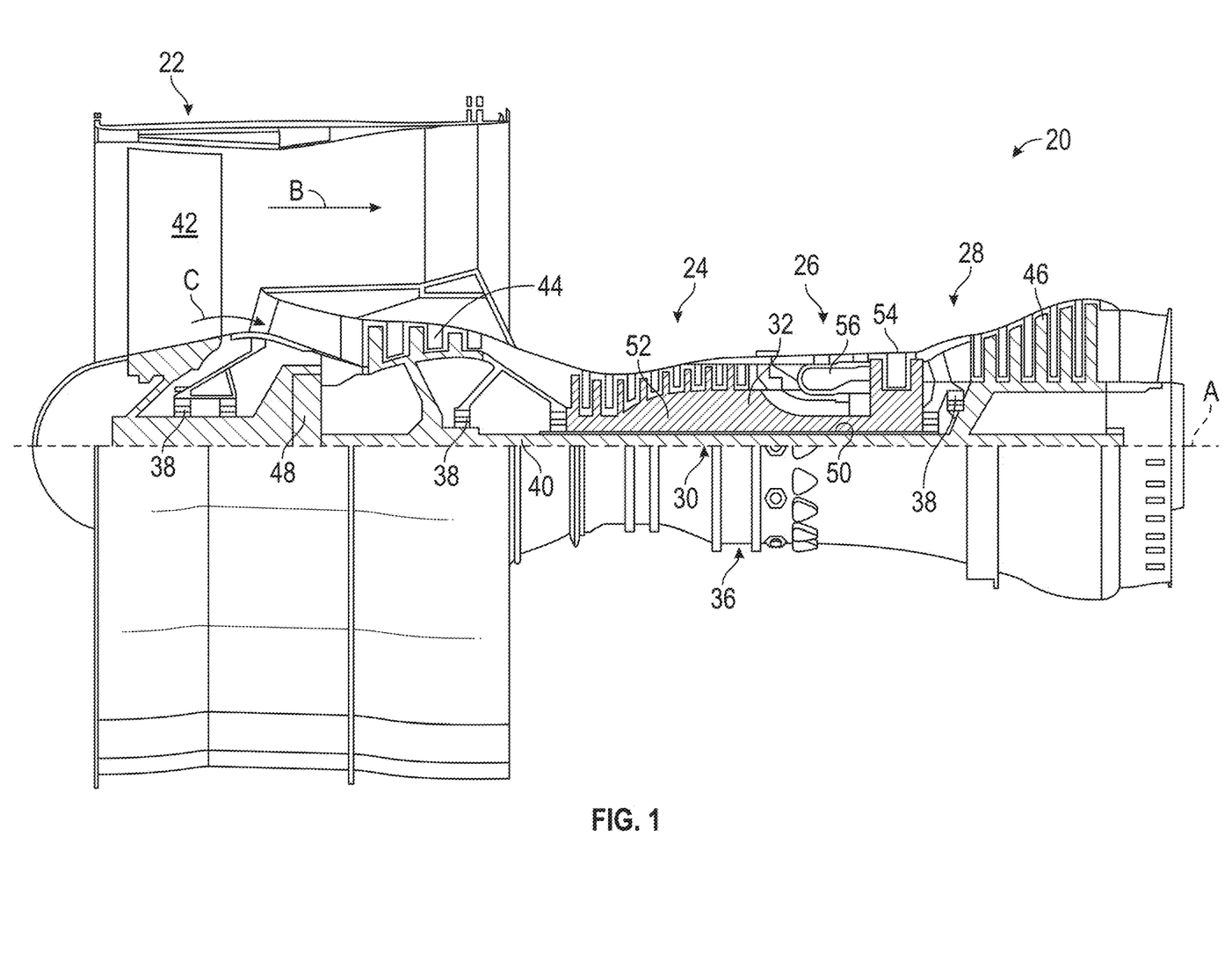
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,°R)/(518.7°R)]^{0.5}$. The "Low corrected fan tip speed" as disclosed herein according to one non-limiting embodiment is less than about 1150 ft/second (350.5 m/sec).

Figure 2:
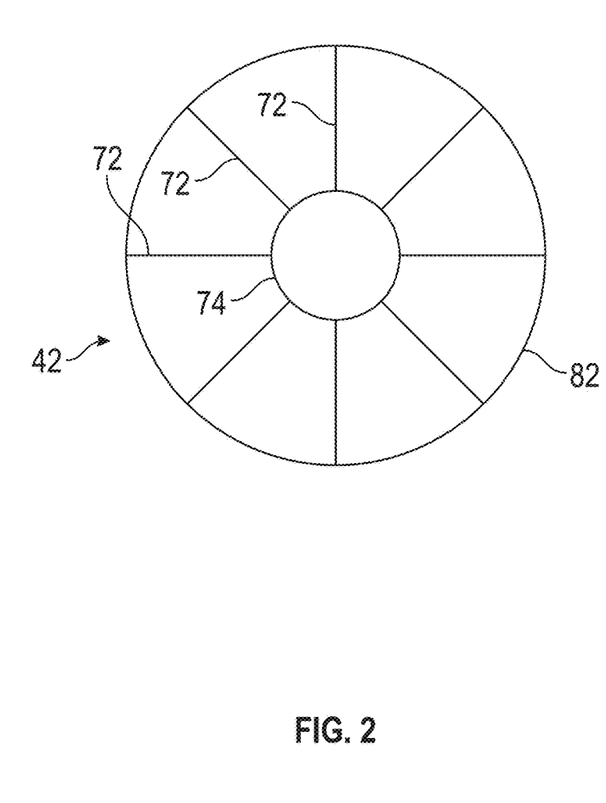
FIG. 2 is a view of a fan assembly with a shroud.
Figure 3:
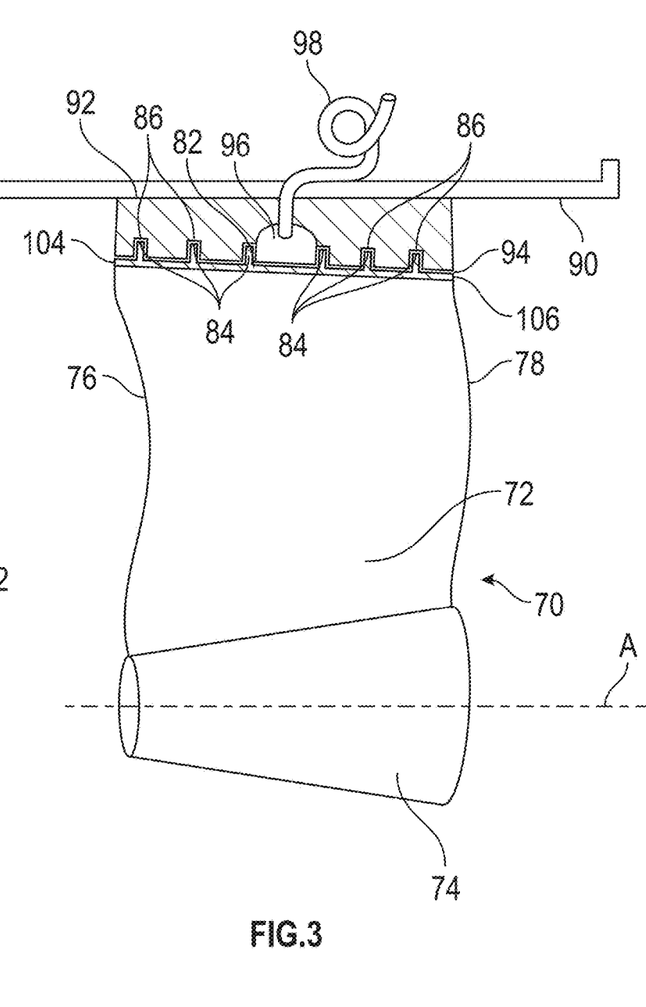
FIG. 3 is a partial cross sectional view of the fan assembly illustrated in FIG. 2.

Referring now to FIGS. 2 and 3, a fan blade 70 of the fan 42 of the engine 20 is illustrated. As is known in the related arts, the fan 42 comprises a plurality of fan blades 70. Each fan blade 70 includes an airfoil 72 and a root or root portion. The root or root portion is received within a slot or cavity of a rotor, rotor disk, fan hub or hub 74 that rotates about axis A of the engine 20. Of course, other means of securement of the fan blades 70 to the hub 74 are contemplated to be within the scope of various embodiments of the present disclosure.

As is known in the related arts, the airfoil 72 has a leading edge 76, a trailing edge 78, and a tip portion 80.

The fan further includes a shroud or blade shroud 82 this is secured to the tip portions 80 of the airfoils 72 of the blades 70 of the fan 42. In accordance with one embodiment, the shroud 82 completely surrounds the airfoils 72 of the fan 42. In other words, the shroud 82 circumferentially surrounds the tip portions 80 of the airfoils as illustrated in at least FIG. 2. The shroud 82 when secured to the airfoils 72 has a plurality of protrusions 84 that are slidably received in a plurality of grooves 86 of a rub strip 88 that is secured to a radial inner surface 90 of a fan containment case 92 of the gas turbine engine 20. As illustrated, the rub strip 88 may have an angled surface such that the thickness of the rub strip 88 with respect to the fan containment case 92 gradually increases from a leading edge 104 to a trailing edge 106 of the shroud 82. Alternatively, the rub strip 88 may have a uniform thickness with respect to the fan containment case 92 or the rub strip 88 may have any thickness with respect to the fan containment case 92. As used herein, leading edge refers to the area that first receives/engages air flowing into the engine 20 and/or fan 42 and trailing edge refers to downstream portions with respect to airflow of the engine 20 and/or fan 42. The grooves 86 being located on a radial inner surface 93 of the rub strip 88. The protrusions 84 are located on a radial outer surface 94 of the shroud 82. In one embodiment, the plurality of protrusions 84 are a series of walls extending radially outward from radial outer surface 94 of the shroud 82.

In addition to grooves 86, the rub strip 88 also has a cavity or plenum 96 that is in fluid communication with a source of air via a conduit 98. In one embodiment, the conduit 98 provides a source of air to cavity or plenum 96 such that an air cushion is provided between rub strip 88 (grooves 86 and the radial inner surface 93) and the shroud (protrusions 84 and radial outer surface 94). In one embodiment, the conduit 98 is fluidly coupled to a high pressure compressor of the gas turbine engine such that bleed air can be provided to cavity 96. In addition and in one embodiment, the plenum 96 is centrally located in rub strip 88. For example, the plenum may be centrally located with respect to a leading edge and a trailing edge of the shroud.

Figure 4:
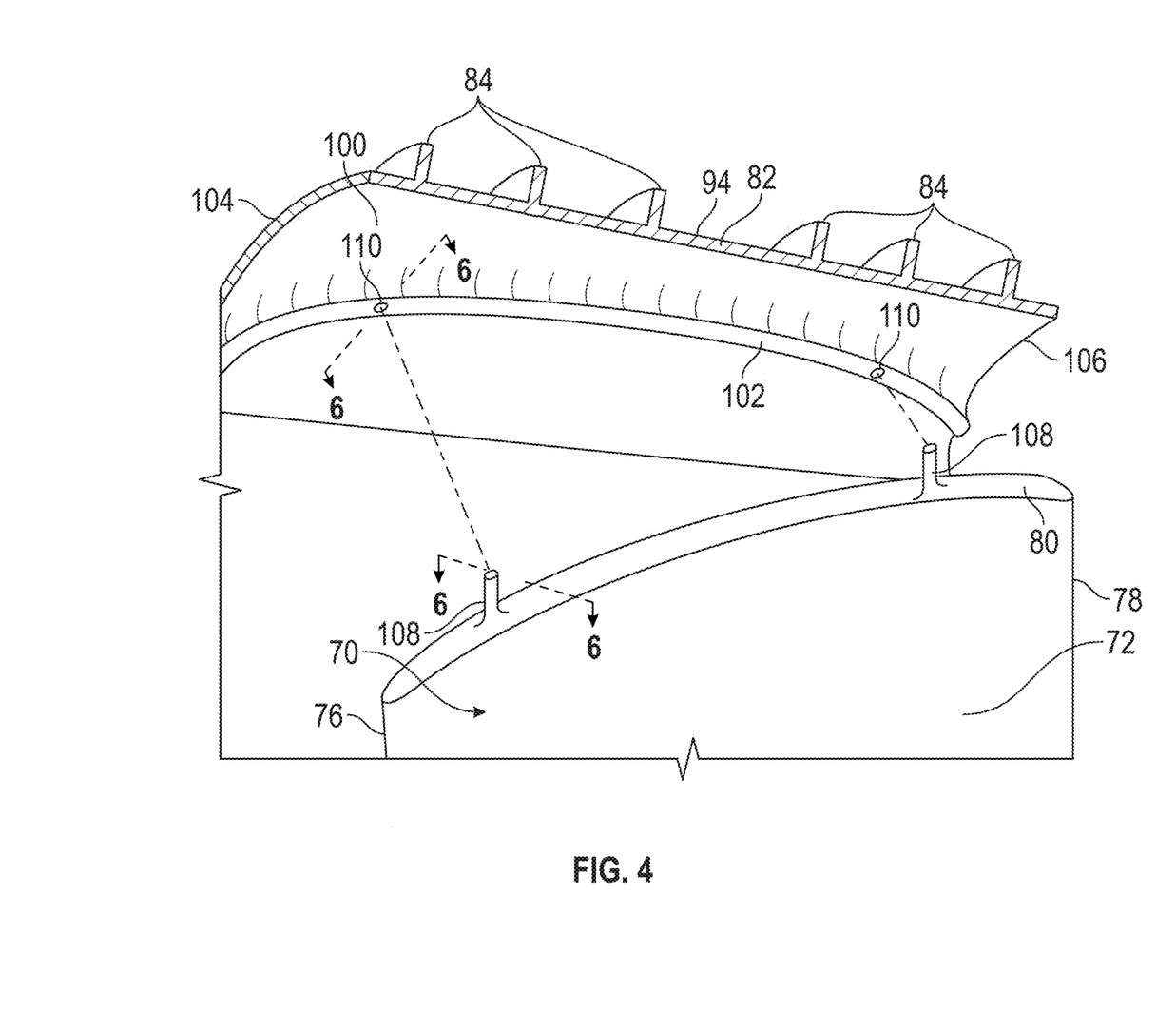
FIG. 4 is an exploded partial cross sectional view of a blade to shroud interface.

Referring now to FIG. 4, securement of the tip portion 80 of the airfoil 72 to a radial inner surface 100 of the shroud 82 is illustrated. Shroud 82 has an elongated opening 102 that extends between the leading edge 104 and the trailing edge 106 of the shroud 82. Elongated opening 102 is configured to receive a portion of a pair of integral pins 108 that extend from the tip portion 80. Pins 108 are releasably secured to opening 102 such that the airfoil 72 may move into and out of the shroud 82 as the engine 20 is operated. Although, a pair of pins 108 are illustrated it is, of course, understood that more or less that two pins 108 may be employed. The elongated opening 102 also includes a pair of bleed holes 110 that are located in elongated opening 102. In one embodiment, the bleed holes 110 are located proximate to the area pins 108 are to be received in. Although, a pair of openings 110 are illustrated it is, of course, understood that more or less that two openings 110 may be employed. Bleed holes 110 are in fluid communication with cavity 96 such that bleed air from conduit 98 can also be provided to the elongated opening in order to provide an air cushion between the tip portion 80 and the shroud 82. In other words, the bleed air travels into the elongated opening 102 through holes 110 in order to provide an air cushion between the tip portion 80 of the airfoil 72 and a radial inner surface of the elongated opening 102.

Figure 5:
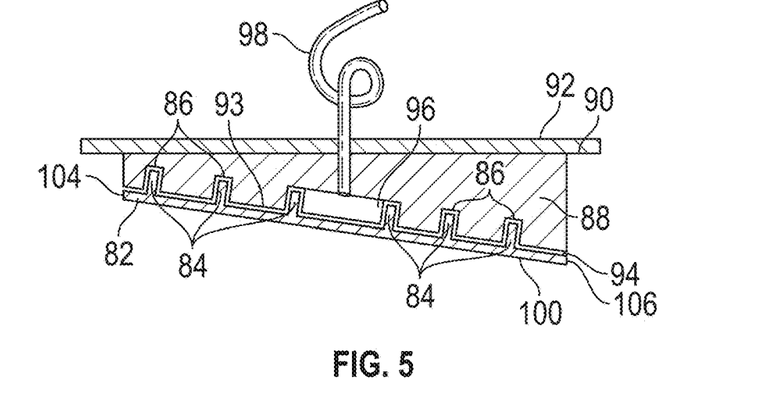
FIG. 5 is a cross-sectional view of the shroud and fan containment case.
Figure 6:
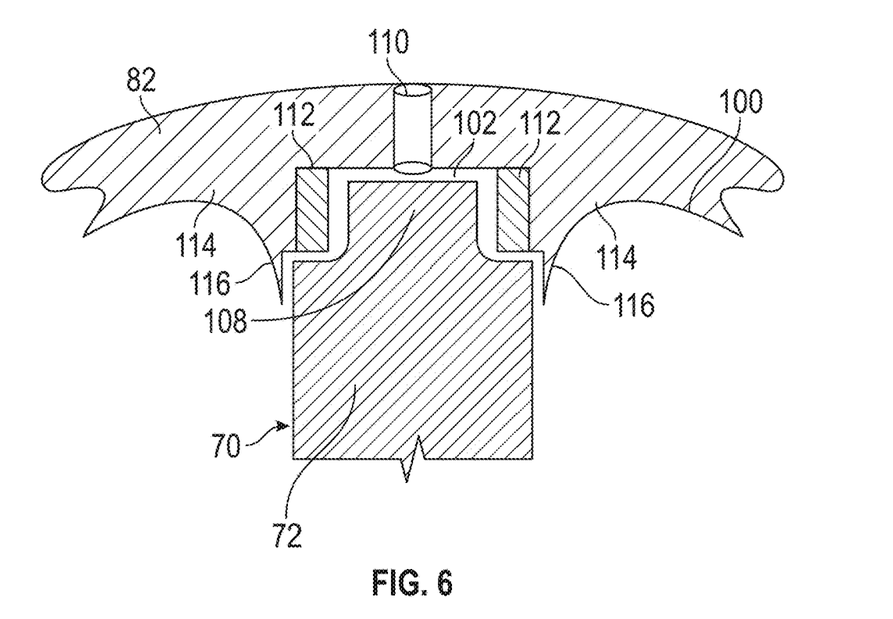
FIG. 6 is a cross-sectional view illustrating the blade to shroud interface along lines 6-6 of FIG. 4.
Figure 6A:
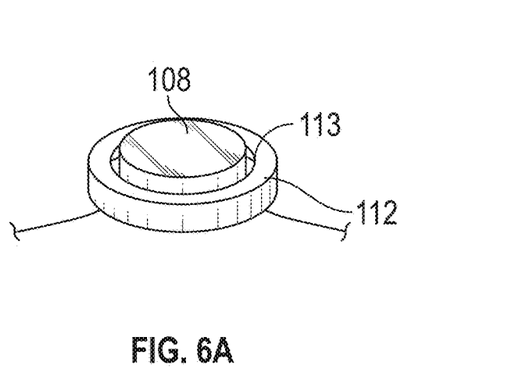
FIG. 6A is an enlarged view of a portion of FIG. 6.

FIG. 5 provides a cross-sectional view of the fan containment case 92, rub strip 88, cavity 96, conduit 98 and shroud 82. Referring now to FIGS. 6 and 6A, pin 108 may be embedded into a bushing 112 that is received in elongated opening 102. In one non-limiting embodiment, the bushing 112 may be formed from ceramic material that is embedded into the elongated opening 102 of the shroud, which in one embodiment may be a reinforced carbon material. As such, bushing 112 provides an opening 113 that pin 108 can slide into and out of. In an alternative embodiment, the bushing 112 is embedded onto the pin 108 and the bushing 112 slides into and out of opening 102 such that movement between the shroud 82 and the airfoil 72 is possible. In particular, radial movement of airfoil 72 up and down with respect to axis A is possible and desired. It being understood that the aforementioned up and down movement is occurs without pin 108 or in the alternative embodiment bushing 112 being completely removed from opening 102.

As illustrated in at least FIG. 6, the bleed hole 110 is aligned with pin 108 such that the air cushion is provided above pin 108. Also shown in FIG. 6 is that the elongated opening 102 may be formed by a pair of side walls 114 that extend radially inward from surface 100. As illustrated, the side walls 114 may have a curved surface 116 that extends from surface 100 to a distal end of side walls 114 to provide an aerodynamic surface for the flow of air past the airfoil 72.

Figure 7:
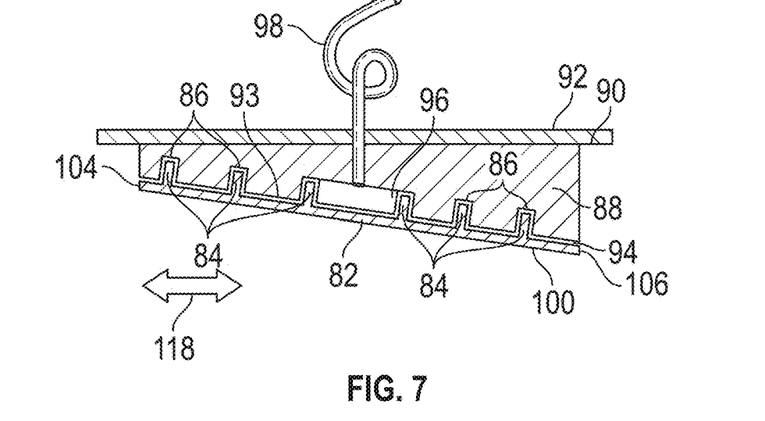
FIG. 7 is a cross-sectional view of the shroud and fan containment case.
Figure 8:
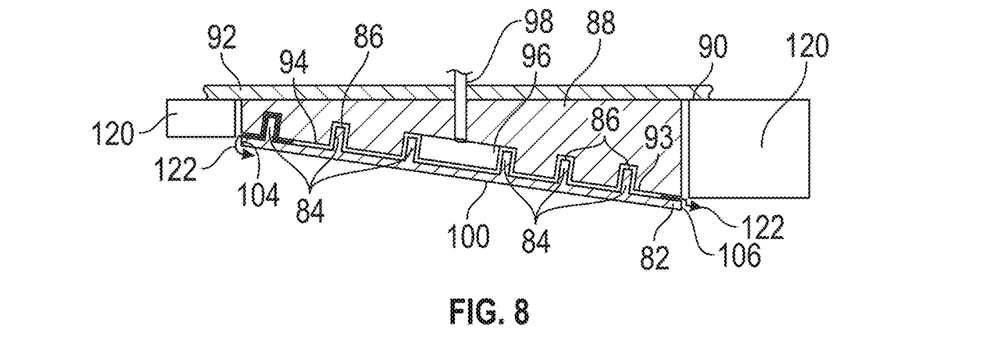
FIG. 8 is another cross-sectional view of the shroud and fan containment case.

As illustrated in FIG. 7, the cavity or plenum 96 is configured to supply air about the outer circumference or outer radial surface of the shroud 82 in order to balance the axial thrust (illustrated by arrows 118) on the shroud 82. FIG. 8 illustrates acoustic liners 120 that are located next to the leading and trailing edge of the shroud. By providing high pressure air to cavity or plenum 96 aero efficiency losses at a gap between the shroud 82 and the acoustic liners 120 is mitigated due to the presence of high pressure bleed air traveling in the direction of arrows 122.

Figure 9:
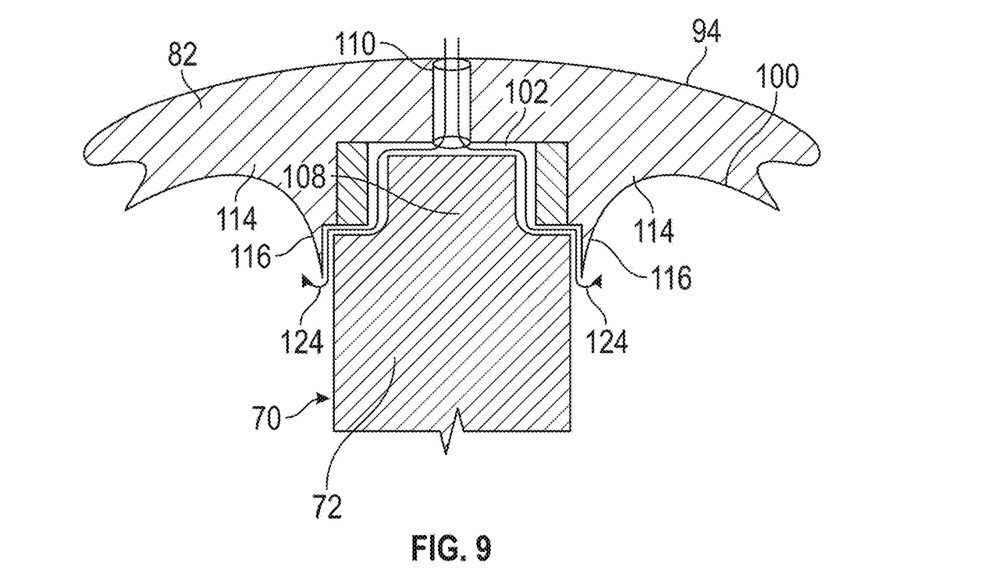
FIG. 9 is a cross-sectional view illustrating the blade to shroud interface.

Referring now to at least FIG. 9, the pin 108, the bushing 112 and bleed hole 110 may be able to support the blade tip 80 with an air journal illustrated by arrows 124 in FIG. 9. Accordingly and during routine operation of the engine 20, the pin 108 and busing 112 are separated by an air cushion and thus hard contact between the shroud and the airfoil only occurs during extreme events.

Figure 10:
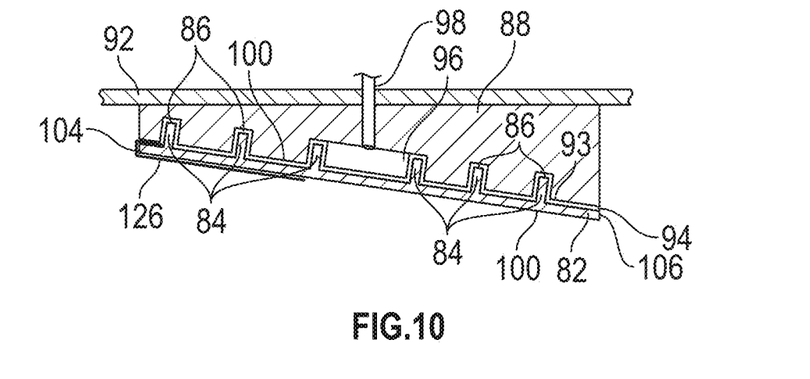
FIG. 10 is a cross-sectional view of the shroud and fan containment case in accordance with an alternative embodiment.

Referring now to FIG. 10 an alternative embodiment is illustrated. Here, the leading edge of the shroud 82 is configured to have an erosion sheath 126. In one embodiment, the sheath 122 may be formed from titanium.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan of a gas turbine engine, comprising:
a plurality of fan blades secured to a rotor, each of the plurality of fan blades having an airfoil secured to the rotor at one end and a tip portion that is moveably secured to a shroud that circumscribes the plurality of fan blades, the shroud having an elongated opening for each tip portion of the plurality of fan blades, the elongated opening extending between a leading edge and a trailing edge of the shroud;
a bleed opening in fluid communication with the elongated opening;
an integral pin extending from the tip portion of each of the plurality of fan blades, the integral pin being movably received in the bleed opening;
a plurality of protrusions extending radially outward from a radial outer surface of the shroud;
a rub strip having a plurality of grooves located in a radial inner surface of the rub strip, the plurality of protrusions being slidably received in the plurality of grooves;
a plenum located in the rub strip the plenum being in fluid communication with the bleed opening; and
wherein an air cushion is provided between the plurality of grooves and the plurality of protrusions and between the tip portion of each of the plurality of blades and the elongated opening for each the tip portion of each of the plurality of blades.

2. The fan as in claim 1, wherein the integral pin is movably received within a bushing that is embedded into the elongated opening.

3. The fan as in claim 2, wherein the shroud has a sheath secured to a leading edge of the shroud.

4. The fan as in claim 1, wherein the shroud has a sheath secured to a leading edge of the shroud.

5. The fan as in claim 1, wherein the bleed opening is a pair of bleed openings and the integral pin is a pair of integral pins, the pair of integral pins being movably received in the pair of bleed openings.

6. The fan as in claim 5, wherein the pair of integral pins are each movably received within a bushing that is embedded into the elongated opening.

7. The fan as in claim 5, wherein the shroud has a sheath secured to a leading edge of the shroud.

8. A fan assembly of a gas turbine engine, comprising:
a plurality of fan blades secured to a rotor, each of the plurality of fan blades having an airfoil secured to the rotor at one end and a tip portion that is moveably secured to a shroud that circumscribes the plurality of fan blades, the shroud being rotatably received within a fan containment case of the fan assembly, the shroud having an elongated opening for each tip portion of the plurality of fan blades, the elongated opening extending between a leading edge and a trailing edge of the shroud;
a bleed opening in fluid communication with the elongated opening;
an integral pin extending from the tip portion of each of the plurality of fan blades, the integral pin being movably received in the bleed opening;
a plurality of protrusions extending radially outward from a radial outer surface of the shroud;
a rub strip secured to the fan containment case, the rub strip having a plurality of grooves located in a radial inner surface of the rub strip, the plurality of protrusions being slidably received in the plurality of grooves;
a plenum located in the rub strip the plenum being in fluid communication with the bleed opening; and
wherein an air cushion is provided between the plurality of grooves and the plurality of protrusions and between the tip portion of each of the plurality of blades and the elongated opening for each the tip portion of each of the plurality of blades.

9. The fan assembly as in claim 8, wherein the bleed opening is a pair of bleed openings and the integral pin is a pair of integral pins, the pair of integral pins being movably received in the pair of bleed openings.

10. The fan assembly as in claim 9, wherein the pair of integral pins are each movably received within a bushing that is embedded into the elongated opening.

11. The fan assembly as in claim 8, wherein the plenum is fluidly coupled to a source of air.

12. The fan assembly as in claim 8, wherein the integral pin is movably received within a bushing that is embedded into the elongated opening.

13. The fan assembly as in claim 12, wherein the shroud has a sheath secured to a leading edge of the shroud.

14. The fan assembly as in claim 8, wherein the shroud has a sheath secured to a leading edge of the shroud.

15. A gas turbine engine, comprising:
a fan, comprising; a plurality of fan blades secured to a rotor, each of the plurality of fan blades having an airfoil secured to the rotor at one end and a tip portion that is movably secured to a shroud that circumscribes the plurality of fan blades, the shroud being rotatably received within a fan containment case of the fan assembly, the shroud having an elongated opening for each tip portion of the plurality of fan blades, the elongated opening extending between a leading edge and a trailing edge of the shroud;
a bleed opening in fluid communication with the elongated opening;
an integral pin extending from the tip portion of each of the plurality of fan blades, the integral pin being movably received in the bleed opening;
a plurality of protrusions extending radially outward from a radial outer surface of the shroud;
a rub strip secured to the fan containment case, the rub strip having a plurality of grooves located in a radial inner surface of the rub strip, the plurality of protrusions being slidably received in the plurality of grooves;
a plenum located in the rub strip the plenum being in fluid communication with the bleed opening;
wherein an air cushion is provided between the plurality of grooves and the plurality of protrusions and between the tip portion of each of the plurality of blades and the elongated opening for each the tip portion of each of the plurality of blades;
a compressor;
a combustor; and
a turbine.

16. The gas turbine engine as in claim 15, wherein the bleed opening is a pair of bleed openings and the integral pin is a pair of integral pins, the pair of integral pins being movably received in the pair of bleed openings.

17. The gas turbine engine as in claim 16, wherein the pair of integral pins are each movably received within a bushing that is embedded into the elongated opening.

18. The gas turbine engine as in claim 15, wherein the integral pin is movably received within a bushing that is embedded into the elongated opening.

19. The gas turbine engine as in claim 18, wherein the shroud has a sheath secured to a leading edge of the shroud.

20. The gas turbine engine as in claim 15, wherein the shroud has a sheath secured to a leading edge of the shroud.

* * * * *